United States Patent [19]

Slick

[11] 3,951,550

[45] Apr. 20, 1976

[54] DIRECTION-SENSING VIRTUAL APERTURE RADIATION DETECTOR

[75] Inventor: E. Paul Slick, Fort Wayne, Ind.

[73] Assignee: The Magnavox Company, Fort Wayne, Ind.

[22] Filed: Aug. 12, 1974

[21] Appl. No.: 496,680

[52] U.S. Cl. ............................... 356/141; 356/152; 356/155; 356/172
[51] Int. Cl.² ........................................ G01B 11/26
[58] Field of Search ........... 356/155, 152, 141, 172; 250/203 R, 342, 211 K, 239; 338/15, 18

[56] References Cited
UNITED STATES PATENTS

| | | | |
|---|---|---|---|
| 3,205,361 | 9/1965 | Albus | 250/203 R |
| 3,302,512 | 2/1967 | Davidson | 356/152 |
| 3,617,131 | 11/1971 | Taguchi | 356/152 |
| 3,641,351 | 2/1972 | Hintringer et al. | 250/203 R |
| 3,649,122 | 3/1972 | Holtz | 356/172 |
| 3,709,609 | 1/1973 | Spengler et al. | 356/155 |
| 3,719,424 | 3/1973 | Weischedel | 356/141 |
| 3,723,013 | 3/1973 | Stirland et al. | 356/152 |
| 3,739,176 | 6/1973 | Thorn | 250/203 R |

Primary Examiner—Maynard R. Wilbur
Assistant Examiner—S. C. Buczinski
Attorney, Agent, or Firm—Thomas A. Briody; William J. Streeter; Joe E. Barbee

[57] ABSTRACT

A radiation sensor for determining a direction, relative to the sensor, in which a radiation source is located. A plurality of elongated radiation detectors are located in a base plane of the sensor. In a plane, disposed before the base plane of the sensor, slits, associated with each radiation detector, are positioned at an angle with respect to direction of elongation of the associated radiation detector. The slits provide planes of radiation which intersect each elongated radiation detector. A coordinate of the intersection of the radiation with the detector is provided by output signals from the detector. The coordinates of the intersection of the radiation with the elongated detectors can determine the location of the radiation source when more than two radiation detectors (of which two are non-parallel) are utilized, or a direction of the radiation source when two non-parallel radiation detectors are utilized.

A plurality of sensors can determine the location of the radiation source through the intersection of the directions determined by the respective sensors. In addition, a plurality of detected radiation sources, coupled to an object, can locate a direction of a radiation source relative to the object.

9 Claims, 4 Drawing Figures

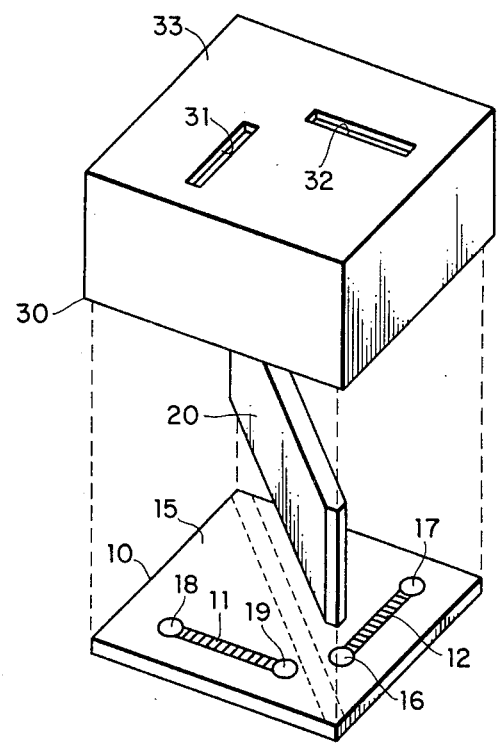
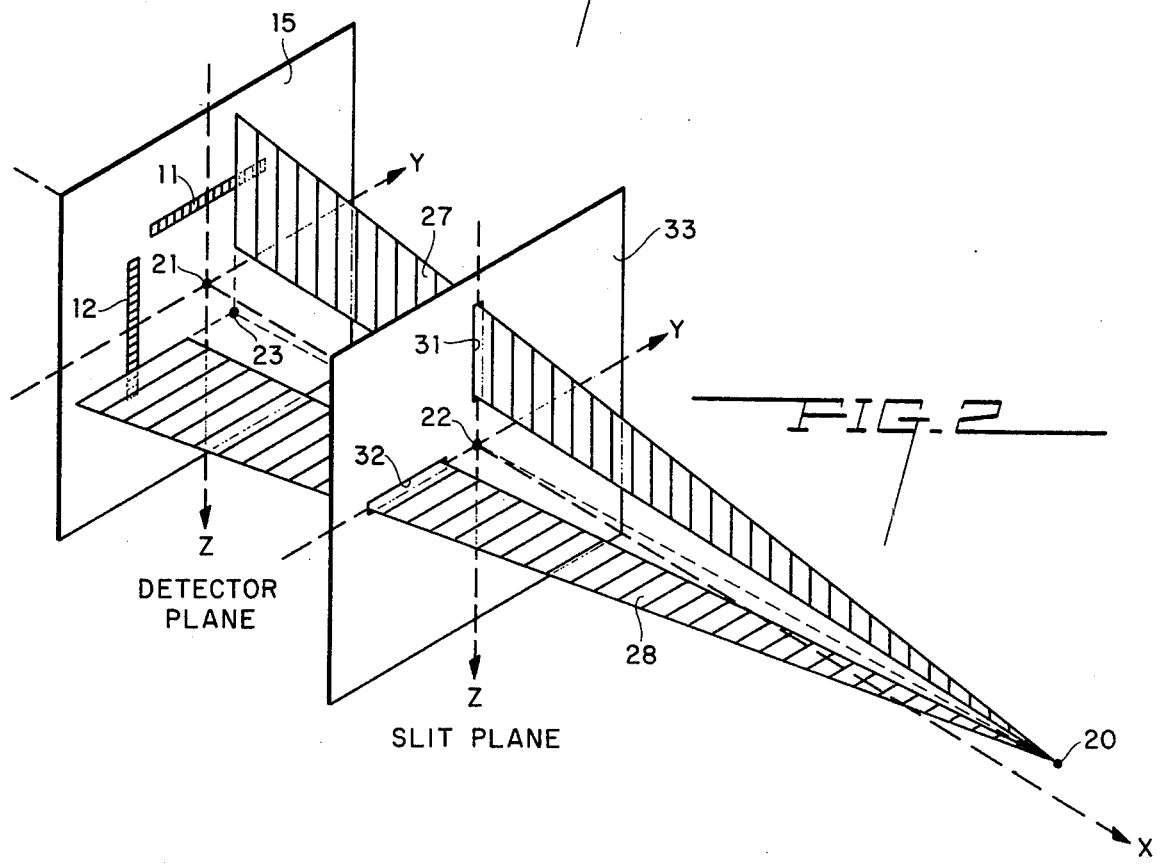

DIRECTION-SENSING VIRTUAL APERTURE RADIATION DETECTOR

BACKGROUND OF THE INVENTION

1. Field of the Invention

This invention relates generally to radiation sensors and more particularly to that class of radiation sensors which determines a location of a radiation source relative to the sensor.

2. Description of the Prior Art

In the prior art, it is known that a dynamic null tracking detector can be utilized when the identification of a direction of a radiation is desired. For example, a sensor having a null position with a plurality of detectors surrounding the null position can be arranged with an aperture disposed generally between the radiation detectors and a radiation source. When radiation does not fall on the null position, the particular radiation detector receiving the radiation activates mechanical apparatus which positions the impinging radiation on the null position, the aperture and the null position thereby providing a specified direction of the radiation source. The use of mechanical apparatus is generally undesirable because such apparatus is relatively fragile and costly to maintain.

A second method of providing the identification of a direction is to permit the impinging radiation to be collimated by an aperture and to fall on a matrix of radiation sensing devices. The position of the radiations sensing device producing the largest radiation-induced signal establishes a direction along which the radiation source is located relative to the aperture and matrix of the sensor. The complexity of the fabrication of the matrix of radiation sensing devices and the associated addressing apparatus is an undesirable feature of this type of sensor.

It is therefore an object of the present invention to provide an improved radiation sensing device.

It is also an object of the present invention to provide a radiation sensing device which establishes the direction of a radiation source relative to the sensing device.

It is a further object of the present invention to determine a direction of impinging radiation without the use of mechanical apparatus.

It is a further object of the present invention to provide a method for determining an axis along which a radiation source is located without utilization of a matrix of radiation detectors.

It is a further object of the present invention to determine a plane containing a radiation source by means of an elongated radiation detector and a slit in a plane located between the source and the detector and situated at an angle to the detector.

It is a more particular object of the present invention to provide a sensor for determining an axis locating a radiation source, the sensor including a plurality of elongated radiation detectors and a plurality of slits, each slit being positioned in a plane between the radiation sources and a radiation detector associated with the slit.

It is still a further object of the present invention to provide a radiation sensor wherein the output signal of a radiation detector identifies a coordinate of a radiation source.

It is yet another object of the present invention to provide a plurality of sensors which can locate a radiation source.

It is still another object of the present invention to provide a plurality of sensors for determining a direction defined by the positions of a plurality of light sources.

SUMMARY OF THE INVENTION

The aforementioned and other objects are accomplished, according to the present invention, by a sensor having in a base plane at least one elongated radiation detector. Signals extracted from each radiation detector locate a narrow band of radiation illuminating the detector. The narrow band of radiation is provided by a slit positioned between the radiation source and the radiation detector associated with the slit. The slit is positioned at an angle relative to an associated elongated radiation detector. Each elongated radiation detector is positioned at an angle with respect to the other radiation detectors. Radiation from a localized source, collimated by the slits associated with each radiation detector, can be identified with a plane in which the radiation source is located. Two radiation detectors, by specifying intersecting planes, determine a line, or an axis, along which the radiation source is located.

A plurality of sensors can be used to determine the position of a radiation source, i.e. by the intersection of the axes determined by individual sensors. By appropriate activation of a plurality of radiation sources (i.e. activation in a predetermined time sequence), the positions of the plurality of radiation sources can be determined and a direction, defined by the plurality of radiation sources, can be identified.

These and other features of the present invention will be understood upon reading of the following description along with the drawings.

BRIEF DESCRIPTION OF THE DRAWINGS

FIG. 1 is a schematic diagram of the sensor according to the preferred embodiment.

FIG. 2 is a schematic diagram of the operation of the slits and associated radiation detectors, providing a location of an image of a radiation source.

DESCRIPTION OF THE PREFERRED EMBODIMENT

Detailed Description of the Figures

Referring first to FIG. 1, an exploded diagram of the sensor according to the preferred embodiment is shown. A Base Plate 10 has coupled to an Interior Surface 15, two elongated Radiation Detectors 11 and 12. Detector 11 is coupled to associated electrical circuitry, not shown, via Terminals 18 and 19 while elongated Radiation Detector 12 is coupled to electronic circuitry, not shown, via Terminals 16 and 17.

A Cover 30 is coupled to Base Plate 10 in such a manner that undesired radiation reaching the Detectors is minimized. Slit 31 is provided in a portion of Cover 30 located between Radiation Detector 11 and a radiation source, while Slit 32 is provided in a portion of Cover 30 located between Radiation Detector 12 and the radiation source. Partition 20 minimizes light reaching Detector 12 via Slit 31 and minimizes light reaching Detector 11 via Slit 32.

Referring next to FIG. 2, a method is shown of determining the position of an axis or line along which a Radiation Source 20 is located, utilizing the sensor of FIG. 1. Slits 31 and 32 are positioned along mutually perpendicular lines in Slit Plane 33, the Slits determining lines intersecting at Point 22. In the preferred embodiment, Slits 31 and 32 have substantially the same dimensions and are located substantially the same distance from Point 22. It will be clear to one skilled in the art, however, that other configurations for the slits are possible.

Slit 31 establishes a Radiation Plane 27 while Slit 32 establishes a Radiation Plane 28. The Radiation Plane 27 impinges upon a Radiation Detector 11, the Radiation Plane intersecting the Detector at substantially a 90° angle in the preferred embodiment. Similarly, the Radiation Plane 28 impinges upon Radiation Detector 12, the Radiation Plane intersecting the Detector at substantially a 90° angle in the preferred embodiment. The radiation impinging upon the Detectors 11 and 12 results in signals being generated by each detector. The signals from both Detectors designate position Point 23 in the Base Plane 15. The coordinate axes have an origin Point 21 in the Base Plane 15 directly beneath the virtual Pinhole 22. The location of Point 23 determines, along with Point 22, having a known and fixed position, the line or direction along which the Radiation Source 20 is located.

Figure 3A:
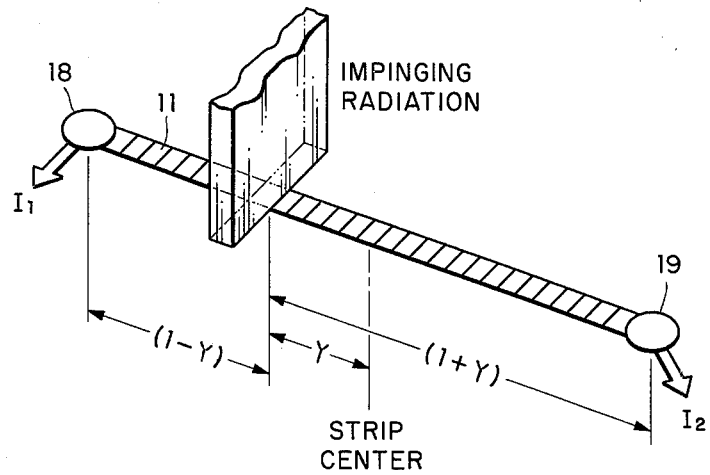
FIG. 3a illustrates the configuration of a strip radiation detector for measuring a coordinate for impinging radiation.
Figure 3B:
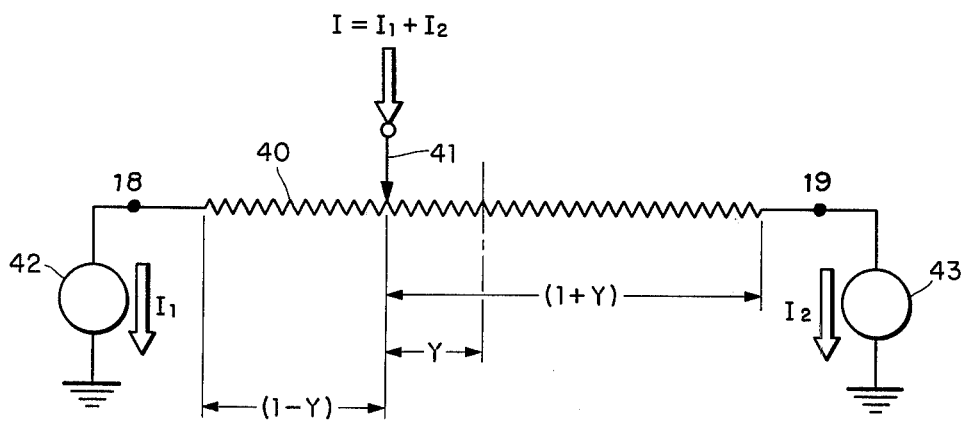
FIG. 3b illustrates the method of coordinate determination utilizing the strip radiation detector.

Referring now to FIG. 3a, elongated or strip Radiation Detector 11 coupled to Terminal 18 and Terminal 19 is shown. Radiation Detector 11 is comprised of a rectangular strip of PN or PIN silicon material operated in a reverse bias mode in the preferred embodiment. The reverse bias mode is conventional in the operation of photodetectors as will be clear to one skilled in the art. Terminals 18 and 19, coupled to the two extremities of Detector 11 provide a means for coupling photocurrent $I_1$ and $I_2$ to associated electronic circuitry. Furthermore, as will be clear to those skilled in the art, a bias voltage (not shown) is applied to the photodetector. In the preferred embodiment, the rectangular geometry of the silicon strip provides a substantially uniform resistance per unit length. A substantially uniform resistance per unit length can be achieved for a photodetector by fabricating the longer detector edges to be accurately parallel. The radiation plane formed by the slit, falling on Detector 11, causes photo-current $I_1$ to flow from Terminal 18 and photo-current $I_2$ to flow from Terminal 19. Referring to FIG. 3b, the method of calculating the position of the radiation falling on the detector is shown. A low impedance current measuring Device 42 is coupled between a common terminal and Terminal 18 and measures the current flowing from Terminal 19, while a low impedance current measuring device 43 is coupled between a common terminal and Terminal 19. The impinging radiation causes a current $I = I_1 + I_2$ to be introduced at the position of the intersection radiation with the Detector. The non-illuminated portions of the Detector are physically equivalent to a resistance restricting the flow of the photo-current to ground. Normalizing the length of the photodetector so that the center is 1 unit of length from either Terminal, labelling the uniform resistance per unit length as C, and assuming the radiation intersects the Detector an unknown distance y from the center position (Devices 42 and 43 being chosen to contribute minimum circuit resistance), the current from the point of radiation intersection to ground are proportional to the distance y, thus:

$$I_1 = 1/C(1-y) \quad \quad 1(a)$$

$$I_2 = 1/C(1+y) \quad \quad 1(b)$$

Solving for y $$y = (I_1 - I_2)/(I_1 + I_2) \quad \quad 2$$

Therefore, the comparison of current $I_1$ and current $I_2$ according to Equation 2, determines the position y, from the center of the detector, of the radiation intersecting with the detector. It will be clear to those skilled in the art that variations in the Detector geometry is possible and further, that other photo-detecting materials can be employed, e.g. Schottky-barrier silicon material.

Operation of the Preferred Embodiment

In the preferred embodiment of the instant invention radiation impinging on the Sensor from a Radiation Source determines the location of Point 23 in a plane 15 defined by Detectors 11 and 12. The location of Point 23, and the location of Point 22, having a known and fixed location relative to the Sensor, establish a line along which the Radiation Source is located. Point 23 and Point 22 determine a vector having components, relative to a coordinate system of the Sensor, shown in FIG. 2, of $(x', y', z')$. The $z'$-component is determined by Slit 32 and Detector 12. The $y'$-component is determined by Slit 31 and Detector 11. The $x'$-component is equal to the known spacing between Plane 33 and Plane 15. The position and angular orientation of the Sensor relative to its external surroundings, determines the components of the direction vector of the radiation source in the coordinate system of the surroundings. Thus, two Sensors, responding to the same Radiation Source, establish direction vectors directed toward the Radiation Source relative to each Sensor, and the intersection of the direction vectors defines the coordinates of the Radiation Source.

As will be apparent to those skilled in the art, a Sensor with a single slit and an associated detector can define a plane in which the Radiation Source is located. Thus, three single-strip Sensors, whose positions and orientations are known, can identify three planes, each plane containing the Radiation Source. The intersection of the three planes defines the position of the Radiation Source.

The accuracy of coordinate determination by the photodetector elements will be a function of the physical parameter, such as slit width, photodetector length, etc. It has been found experimentally that this type of sensor can be fabricated to provide a coordinate accuracy of 0.5 percent over an angle of ±30° for a radiation detecting element of approximately one inch. In the preferred embodiment, the slit plan and the base plane are substantially parallel, with each slit being positioned at 90° relative to the associated radiation detecting strip. Each slit is generally positioned in the center of the detector. In addition, each of the two slits, positioned in the slit plane, are positioned at an angle of substantially 90° to the other slit. However, other element configurations will be clear to those skilled in the art.

One application of this invention relates to the determination of the position and orientation of an aircraft pilot's helmet as the pilot orients his head to bring a visual sight-line to the target into alignment with an aiming device attached to his helmet. The aiming device can, for example, be a visible symbol on the helmet visor. Several embodiments of such an aiming device will be apparent to those skilled in the art. It is clear that, in addition to an aircraft pilot, other users such as shipboard navigators, industrial crane operators, etc., can utilize precise knowledge of the line-of-sight vector to a specified object. However, the following discussion is given in relation to an aircraft pilot and his helmet, wherein his objective is to establish a line-of-sight vector to a target for the precise control of sensors and weapons.

In the preferred embodiment for this application, the sensors are coupled to the environment in which the helmet operates (i.e. the aircraft cockpit), while radiation sources are coupled to the helmet itself. However, this arrangement could be reversed if desired. In the preferred embodiment, three or more Radiation Sources are attached to the helmet, and these Radiation Sources activate in a predetermined sequence. Thus, at any moment only one Radiation Source is activated, and the resulting radiation is detected by the Sensors, each of which measures the vector position to the radiating source. As the sequence progresses, the vector positions of the several radiation sources, as measured by the sensors, are stored in a computer memory, from which the orientation and position of the helmet in the surrounding environment can be obtained mathematically. This operation establishes the location and orientation, in the fixed coordinates of the environment (i.e. of the aircraft cockpit), of a coordinate frame which is fixed to the helmet. The visual sight-line vector emanates from the coordinate frame of the helmet. However, the sight-line vector is not required to be co-linear with any of the coordinate axes in the helmet, provided that the vector direction in helmet coordinates can be determined. The relationship between the visual sight-line vector and the helmet coordinate frame can be established by having the operator orient his helmet visual line-of-sight in a known direction. The Sensors can determine the position and orientation of the coordinate frame fixed in the helmet while the sight-line is so aligned. The orientation of the helmet frame in relation to the sight-line vector is thereby measured, and this relationship can be stored in the memory for subsequent use. This operation thus provides a calibration. It will be recalled from the preceeding paragraph that the pilot turns his head to align a visible aiming device or symbol with the target. It is the line from his eye through the aiming symbol that is called the sight-line vector, and its direction in helmet coordinates is determined during calibration. In normal operation, the Sensors determine the coordinate frame fixed to the helmet, and the sight-line relationship to the helmet has been stored, thus the sight-line vector in the coordinate frame of the environment can be readily determined.

The foregoing provisions for calibration assure that the overall accuracy of the system is not degraded by physical changes in the helmet due to handling or the way it is worn, inasmuch as the pilot can re-calibrate whenever desirable. This provision further removes any necessity for highly precise factory assembly or special design features to preserve factory calibration.

It will be clear to those skilled in the art that the Radiation Detectors (11 and 12) can be comprised of a plurality of a discrete elements. By ascertaining the (electrical) state of the discrete elements of the Detector, the element upon which radiation from the Radiation Source impinges can be determined and a related coordinate thereby established. When the Radiation Detector is comprised of a plurality of discrete elements, the signal manipulation described by Equations 1 and 2 for an analog-type Radiation Detector is not required.

The above description is included to illustrate the operation of the preferred embodiment and is not meant to limit the scope of the invention. The scope of the invention is to be limited only by the following claims. From the above disucssion, many variations will be apparent to one skilled in the art that would yet be encompassed by the spirit and scope of the invention.

What is claimed is:

1. A radiation sensing device, comprising:
   a base unit;
   a housing unit adapted to be coupled to said base unit, said housing unit and said base unit providing an interior chamber, said housing including a slit for admitting radiation to said chamber;
   an elongated radiation detector coupled to said base unit, said detector positioned at an angle with respect to said slit; and
   plural means electrically coupled to a first and a second end of said detector and separately measuring currents at the first and second end and whereby currents from said first end and said second end determine an intersection point of said admitted radiation with said detector.

2. The radiation sensing device of claim 1 further including first means for measuring current from said first detector end and second means for measuring current from said second detector end.

3. The radiation sensing device of claim 1 wherein said elongated detector includes a silicon material operated in a reverse bias mode.

4. A method of determining a plane containing a radiation source comprising the steps of:
   establishing a line located in said plane by means of an elongated aperture through which radiation from said radiation source is transmitted; and
   establishing a point in said plane by locating the intersection of said transmitted radiation on location of impact on a strip radiation detector, whereby said point is established by separately indicating currents at both a first and second end of said detector, said line and said point determining said plane containing said radiation source.

5. Apparatus for determining a direction of a radiation source relative to said apparatus comprising:
   a housing unit for enclosing an interior chamber and having an imaging plane;
   at least two elongated radiation detectors coupled to said housing in said chamber, said detectors responsive to radiation from said source, said detectors being positioned at an angle substantially perpendicular to each other;
   at least two slits in said imaging plane in said housing unit, wherein each slit is associated with a radiation detector, said each slit is disposed in a non-parallel position relative to said associated detector;
   at least one partition for isolating radiation entering said chamber by one slit from non-associated detectors; and means for determining a point of intersection with said each detector by radiation transmitted by the slit associated with said each radiation detector.

6. A device for determining a plane relative to said device containing a radiation source, comprising:
- a detector responsive to radiation from said source, said detector being substantially smaller in a width dimension as compared to a length dimension;
- a housing for enclosing said detector, said housing containing a slit-like aperture, wherein radiation entering said housing by said slit interacts with said detector; and
- plural means separately indicating currents at a first and second end of said detector thereby establishing a point of intersection with said detector of said entering radiation.

7. Apparatus for determining an orientation of a first object relative to a second object comprising:
- at least one of a plurality of radiation sources coupled to said first object, radiation from each radiation source being provided with an identifying property;
- a plurality of slit-like apertures coupled to said second object for transmitting radiation from said plurality of radiation sources;
- a plurality of elongated radiation detectors, each of said detectors for detecting radiation transmitted by an associated one of said apertures, wherein positions of said detector and said associated slit-like aperture are maintained in a preestablished spatial relationship; and
- plural means associated with each of said detectors and separately indicating currents at a first and second end of each detector for determining a point of intersection of radiation transmitted by said associated aperture with said detector, each point of intersection and said associated slit-like apertures defining a plane containing said at least one radiation source.

8. The apparatus of claim 7 further including apparatus for determining an intersection of a plurality of planes by said plurality of detectors and associated slit-like apertures.

9. A radiation sensor for determining a plane in which a radiation source is located, comprising:
- a radiation detector responsive to radiation from said radiation source, wherein said detector is generally planar and has one long and one narrow dimension;
- a housing generally disposed between said radiation detector and said radiation source, said housing including a slit, wherein said slit is non-parallel to said radiation detector; and
- plural means separately indicating currents from said radiation detector, said currents related to a point of detected radiation on the radiation detector.

* * * * *